United States Patent [19]

Fisher et al.

[11] Patent Number: 6,079,461

[45] Date of Patent: Jun. 27, 2000

[54] USE OF INERT GAS IN TRANSFER OF COMMINUTED PRODUCT TO TANK

[75] Inventors: Larry Nelson Fisher, Wrightsville, Pa.; Warren Peery Groseclose, Kinston, N.C.

[73] Assignee: The Heil Co., Chattanooga, Tenn.; by said Larry Nelson Fisher

[21] Appl. No.: 09/257,651

[22] Filed: Mar. 2, 1999

Related U.S. Application Data

[60] Provisional application No. 60/096,753, Aug. 17, 1998.

[51] Int. Cl.[7] ................................................. B65B 1/16
[52] U.S. Cl. ........................... 141/231; 141/1; 141/8; 141/65; 141/66; 141/285; 141/63; 406/122; 406/127; 406/145; 406/146; 406/197
[58] Field of Search ..................... 141/1, 4, 6, 8, 141/39, 43, 47, 48, 49, 63, 64, 65, 66, 98, 192, 285, 231; 406/145, 146, 151, 153, 197, 102, 122, 127

[56] References Cited

U.S. PATENT DOCUMENTS

| | | | |
|---|---|---|---|
| 2,539,109 | 1/1951 | Webb | 406/106 |
| 3,309,785 | 3/1967 | King | 406/106 |
| 3,386,629 | 6/1968 | Currie | 406/14 |
| 3,677,311 | 7/1972 | Parrish | 141/1 |
| 3,734,569 | 5/1973 | Vingas | 406/127 |
| 3,809,438 | 5/1974 | Hubbard | 406/106 |
| 3,994,701 | 11/1976 | Schweimanns | 406/175 |
| 4,133,281 | 1/1979 | Holmes et al. | 141/1 |
| 4,320,995 | 3/1982 | Tennes et al. | 406/122 |
| 4,545,410 | 10/1985 | Paul et al. . | |
| 4,592,679 | 6/1986 | Boiting et al. | 406/127 |
| 4,819,700 | 4/1989 | Sommer et al. | 141/1 |
| 4,848,419 | 7/1989 | Damen . | |
| 4,917,544 | 4/1990 | Crahan et al. | 406/14 |
| 4,993,883 | 2/1991 | Jones . | |
| 5,148,945 | 9/1992 | Geatz . | |
| 5,199,826 | 4/1993 | Lawrence . | |
| 5,244,019 | 9/1993 | Derby | 141/65 |
| 5,284,187 | 2/1994 | Schmit | 141/1 |
| 5,316,056 | 5/1994 | Stott . | |
| 5,503,198 | 4/1996 | Becker . | |
| 5,558,135 | 9/1996 | Kronseder et al. | 141/6 |
| 5,562,367 | 10/1996 | Scott . | |
| 5,580,193 | 12/1996 | Battle et al. . | |
| 5,639,188 | 6/1997 | Howanski et al. . | |
| 5,839,484 | 11/1998 | Engle | 141/65 |

FOREIGN PATENT DOCUMENTS

| | | |
|---|---|---|
| 3536134 | 4/1987 | Germany . |
| 1742203A1 | 6/1992 | U.S.S.R. . |

*Primary Examiner*—Steven O. Douglas
*Assistant Examiner*—Khoa Huynh
*Attorney, Agent, or Firm*—Chambliss, Bahner & Stophel, P.C.

[57] ABSTRACT

A method and apparatus for transferring comminuted product from an unpressurized storage unit to a tank, especially a trailer-mounted tank. According to this method, an inert gas source is provided, preferably mounted on the trailer, and a conduit is provided to carry the product, which conduit is connected between the storage unit and the tank. The tank and conduit are evacuated so as to create a pressure differential between the storage unit and the tank, and the inert gas is allowed to flow into the evacuated tank in response to the partial vacuum therein. The product is then allowed to flow through the conduit to the tank in response to the partial vacuum therein. An improved trailer for receiving comminuted product according to a practice of the method is also disclosed.

20 Claims, 5 Drawing Sheets

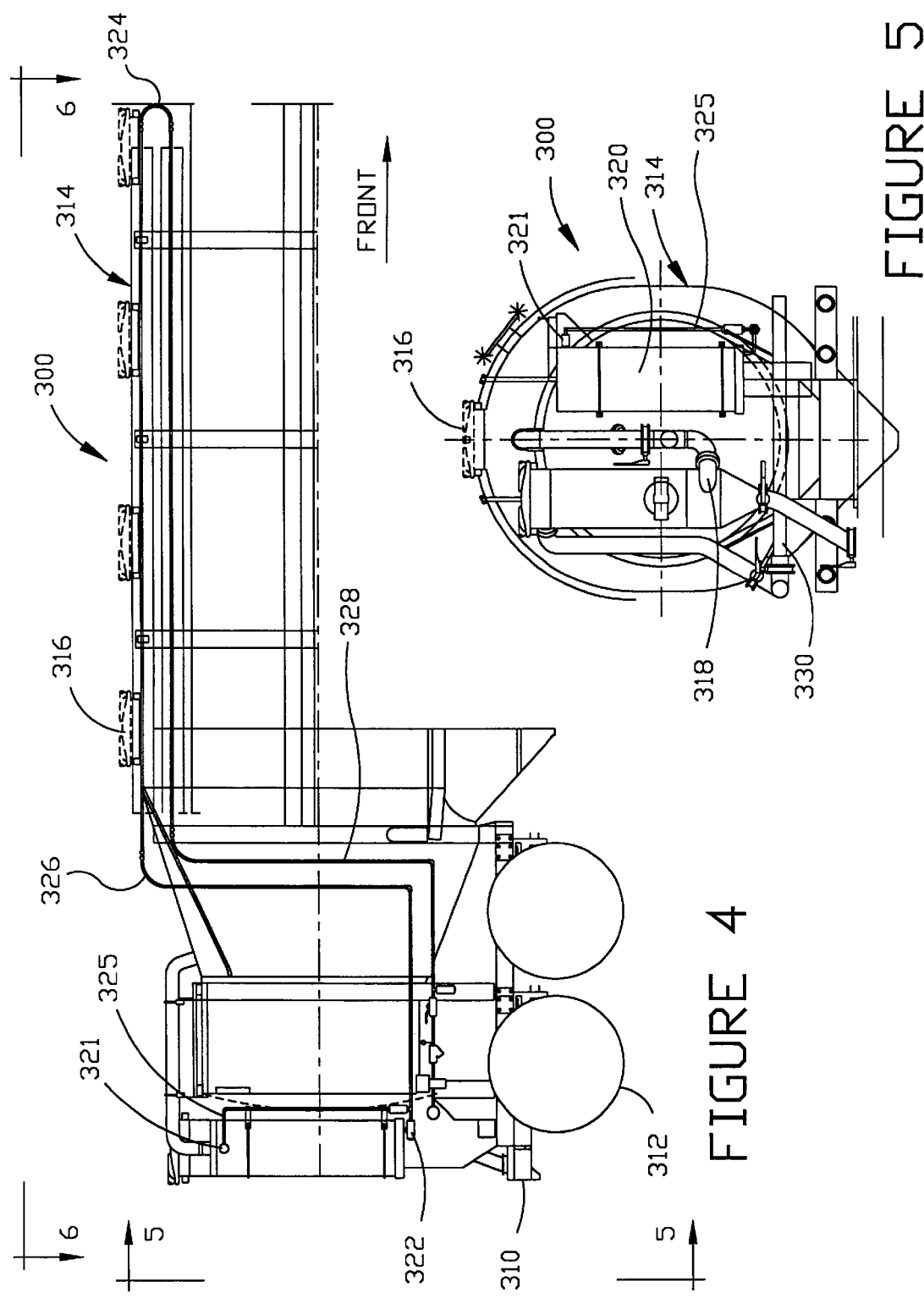

USE OF INERT GAS IN TRANSFER OF COMMINUTED PRODUCT TO TANK

CROSS REFERENCE TO RELATED APPLICATION

This application claims the benefit of U.S. Provisional Application Ser. No. 60/096,753, filed Aug. 17, 1998.

FIELD OF THE INVENTION

This invention relates generally to the transfer of comminuted product from a storage unit to a trailer-mounted tank in response to a pressure differential that is created between the storage unit and the tank. More particularly, the invention relates to a method and apparatus for purging the tank with an inert gas to reduce the oxygen content therein so as to reduce the risk of explosion, and then transferring such product to the tank.

BACKGROUND AND DESCRIPTION OF THE PRIOR ART

Many comminuted materials are conveniently transported by truck. Typically, such trucks include a tractor and an attached trailer having a tank or other container mounted thereon. Frequently, these trailers are referred to as pneumatic tank trailers because of the pneumatic method by which they are typically loaded and unloaded. Conventionally, comminuted materials are transferred from a storage unit to a container such as a trailer-mounted tank by pressurizing the storage unit with air, connecting a conduit from the storage unit to the tank, and permitting the product entrained in the air flow to pass through the conduit from the high-pressure storage unit to the lower-pressure tank. Although the conventional method works well with many types of comminuted materials, problems of product degradation may arise if the materials are temperature sensitive, and there may be a significant risk of explosion if the product is combustible. Because an increase in pressure on a gas is directly proportional to an increase in its temperature (so long as its volume remains constant), pressurizing the air in the storage unit will increase its temperature, and this increased temperature will be transmitted to the product. If the product is temperature sensitive, such as plastic pellets, for example, pressurizing the air in the storage unit may even raise the temperature of the product past its melting point. In addition, the transport by air entrainment of comminuted product may result in the generation of sparks by friction between the product and the discharge port or hopper of the storage unit or the conduit within which the product is transported, or in the generation of sparks resulting from static electricity charges that are produced in the atmosphere of the tank as the product is transported into it. If such product is finely divided and combustible, the generation of such sparks may result in explosion.

Various methods have been developed to deal with the problem of transport of temperature sensitive or combustible products. These methods generally involve a cooling of the pressurized air or a substitution of an inert gas for the pressurizing air. Thus, for example, it is known to employ a water-filled sheath around the conduit carrying the pressurizing air stream to the storage unit. However, such a device requires that a supply of water be readily available at the point of transfer, as well as the means for its disposal. It is also known to place cooling fins on the product conveying conduit. However, such cooling fins are bulky, heavy and expensive, and only marginally effective. It is also known to reduce the temperature created in a pressurizing system by restricting the operation of the compressor to reduce the pressure produced. However, such restriction will slow the transfer process since the pressure differential between the high-pressure storage unit and the tank will not be as great. U.S. Pat. No. 5,580,193 describes another method for reducing the temperature of the pressurizing air by placing a heat exchanger in the air stream. However, such apparatus, which may be effective in reducing the temperature to which the product is exposed, will not reduce the risk of explosion due to sparking in the transport of finely divided combustible product.

It is also known that nitrogen may be substituted for air as the pressurizing gas in order to reduce the risk of explosion during transfer of a combustible product. Pumping additional nitrogen into the storage unit may be employed to reduce the oxygen content of the air in the unit below that which would support combustion. However, a nitrogen pressurizing system will increase the temperature of the resulting gas mixture as much as an air pressurizing system. In addition, a nitrogen pressurizing system requires that a nitrogen source be available at the product transfer point, and it requires a relatively large volume of nitrogen to be effective. For example, a nitrogen pressurizing system that is aimed at reducing the oxygen content by half (from about 21% to about 10.5%) in a 1500 cubic foot storage unit will require the introduction of 1500 cubic feet of nitrogen. Thus, the requirement for provision of a nitrogen source limits the locations at which the product may be transferred to facilities having sufficient quantities of such gas available, and the use of nitrogen increases the expense of transferring the product.

It is also known that a conduit may be connected between a storage unit (such as a railcar) that is open to the atmosphere and a trailer mounted tank, and the air in the tank withdrawn and evacuated to the atmosphere so as to reduce the pressure in the tank below that in the storage unit. Comminuted product stored in the storage unit will then flow under the influence of the higher atmospheric pressure in the railcar to the lower pressure tank. Although this type of loading system will not likely result in a significant increase in the temperature of the product being transferred, it will entail a risk of explosion due to sparking in the transport of finely divided combustible product.

It would be desirable, therefore, if a method and apparatus could be provided that could be used to transfer comminuted product from a storage facility to a container such as a trailer-mounted tank while minimizing any increase in the temperature to which the product is exposed. It would also be desirable if such a method could be provided that would minimize the risk of explosion during transfer of the comminuted materials. In addition, it would be desirable if such a method could be provided that would not require that special facilities be available at the transfer point. It would also be desirable if an improved trailer-mounted tank could be provided that would operate according to such method at conventionally equipped transfer facilities.

OBJECTS AND ADVANTAGES OF THE INVENTION

Accordingly, it is an object of the invention claimed herein to provide a method and apparatus for transfer of comminuted product from a storage facility to a container such as a trailer-mounted tank that minimizes any increase in the temperature to which the product is exposed, or any risk of explosion in the transfer. It is another object of the invention to provide such a method that does not require that water or nitrogen gas be available at the transfer point. It is yet another object of the invention to provide an improved trailer-mounted tank that may be employed in the operation of the method described and claimed herein at conventionally equipped transfer facilities.

Additional objects and advantages of this invention will become apparent from an examination of the drawings and the ensuing description.

EXPLANATION OF TECHNICAL TERMS

As used herein, the term comminuted product refers to granular or fluent particulate materials that may be transported in bulk, and are capable of being entrained in air. Such materials include agricultural products, such as grain, corn kernels, beans, flour, sugar, peanuts and the like, and intermediate products for various industrial uses, such as plastic pellets, coke, lime, silica gel, powdered acid resins, rare earth powders and many others.

As used herein, an unpressurized storage unit describes a storage unit for comminuted materials that may be unloaded according to the invention. Such storage unit is unpressurized, meaning that it is not pressurized by external means in order to unload it according to the invention, although it may be capable of being pressurized. It may also be vented or otherwise exposed to the atmosphere so as to be under the influence of atmospheric pressure. Storage units which may be unloaded according to the invention include mobile storage units such as railcars, trailer-mounted tanks and open-hopper trucks, and fixed storage units such as bins, silos and the like. Preferably, such storage units will be equipped with a gravity-fed hopper through which the comminuted product may be conveniently withdrawn.

As used herein, a tank describes a container that is provided with an enclosed volume for containing comminuted product.

As used herein, a trailer-mounted tank describes a container that is mounted on wheels, and which is provided with an enclosed volume for containing comminuted product. An over-the-road trailer, adapted for being hauled by a tractor, may include a trailer-mounted tank.

As used herein, the term inert gas describes a gas or mixture of gases that will not support combustion of the comminuted product. In addition to the inert gases of Group 0 of the periodic table of elements, other elements, compounds and mixtures that exist in the gaseous state at standard atmospheric pressures and temperatures, and which will not support combustion of the comminuted product, may be described as inert gases. Nitrogen is the preferred inert gas for use in connection with the invention, although other gases, including argon, helium and carbon dioxide, and mixtures of such gases may be used.

SUMMARY OF THE INVENTION

The invention comprises a method and apparatus for transferring comminuted product from an unpressurized storage unit to a tank. According to the invention, an inert gas source is provided, along with a conduit to carry the product from the storage unit to the tank. The conduit is connected between the storage unit and the tank, and the tank and conduit are evacuated so as to create a pressure differential between the storage unit and the tank. The inert gas is allowed to flow into the evacuated tank in response to the partial vacuum therein, and the product is allowed to flow through the conduit to the tank in response to the partial vacuum therein. A preferred embodiment of the invention is the provision of an improved trailer for receiving and carrying comminuted product, which is provided with an inert gas source that is mounted thereon.

In order to facilitate an understanding of the invention, the preferred embodiments of the invention are illustrated in the drawings, and a detailed description thereof follows. It is not intended, however, that the invention be limited to the particular embodiments described or to use in connection with the apparatus illustrated herein. Various modifications and alternative embodiments such as would ordinarily occur to one skilled in the art to which the invention relates are also contemplated and included within the scope of the invention described and claimed herein.

BRIEF DESCRIPTION OF THE DRAWINGS

The presently preferred embodiments of the invention are illustrated in the accompanying drawings, in which like reference numerals represent like parts throughout, and in which:

FIG. 4 is an side view of an improved trailer that operates according to the invention.

FIG. 5 is an end view of the trailer of FIG. 4, taken along the line 5—5 of FIG. 4.

DESCRIPTION OF THE PREFERRED EMBODIMENTS OF THE INVENTION

Figure 1:
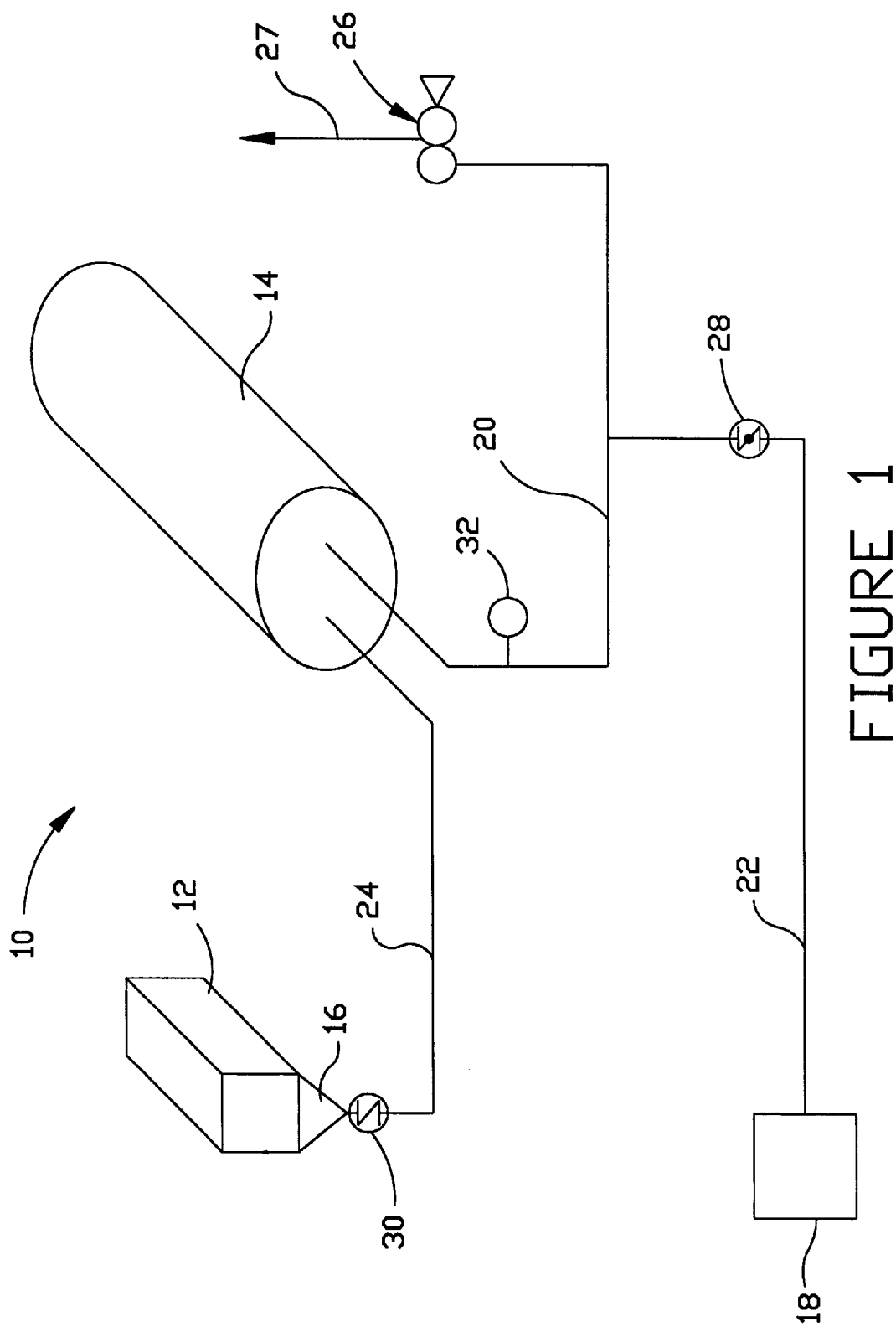
FIG. 1 is a schematic illustration of a first embodiment of the invention.
Figure 2:
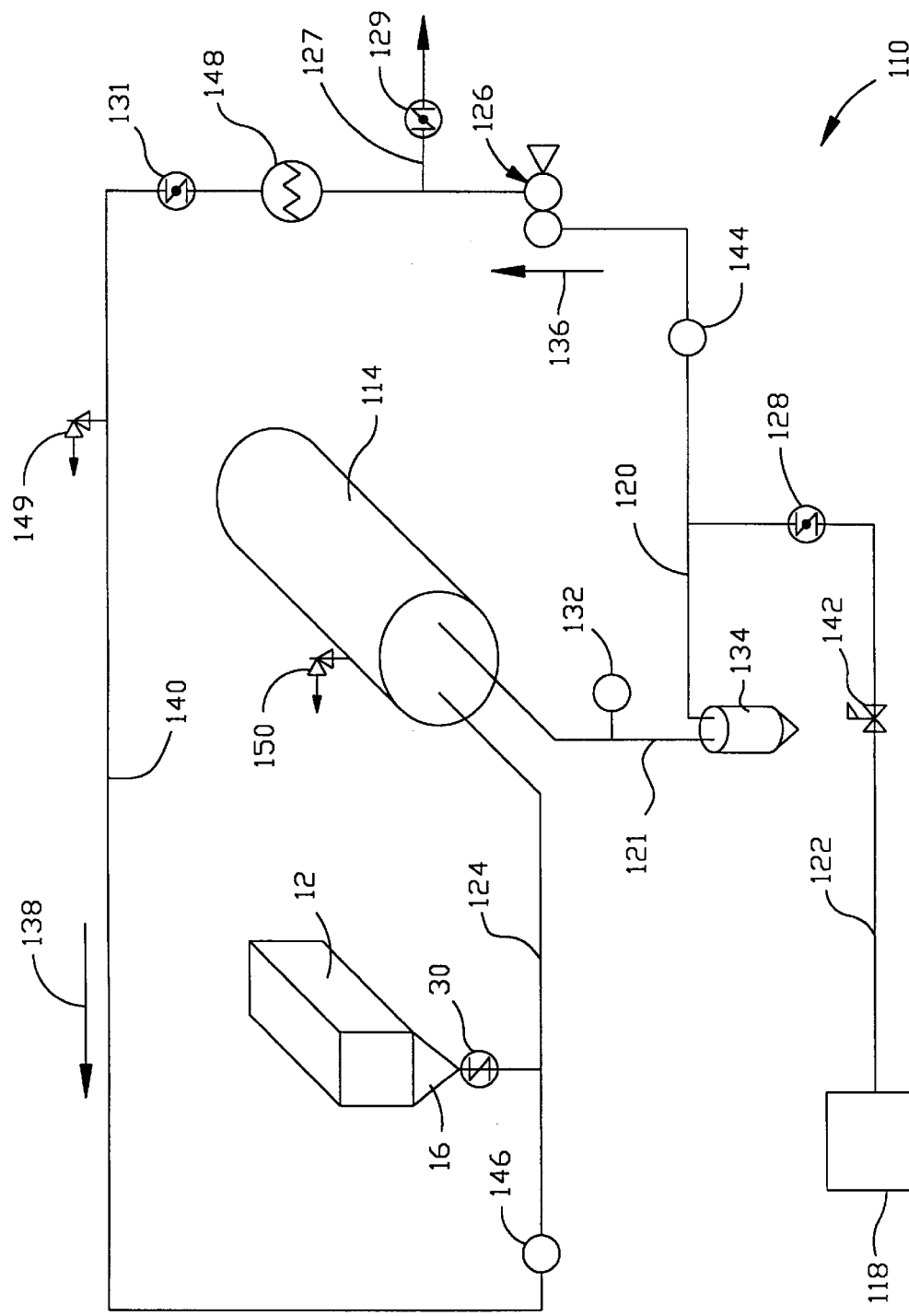
FIG. 2 is a schematic illustration of a second embodiment of the invention.
Figure 3:
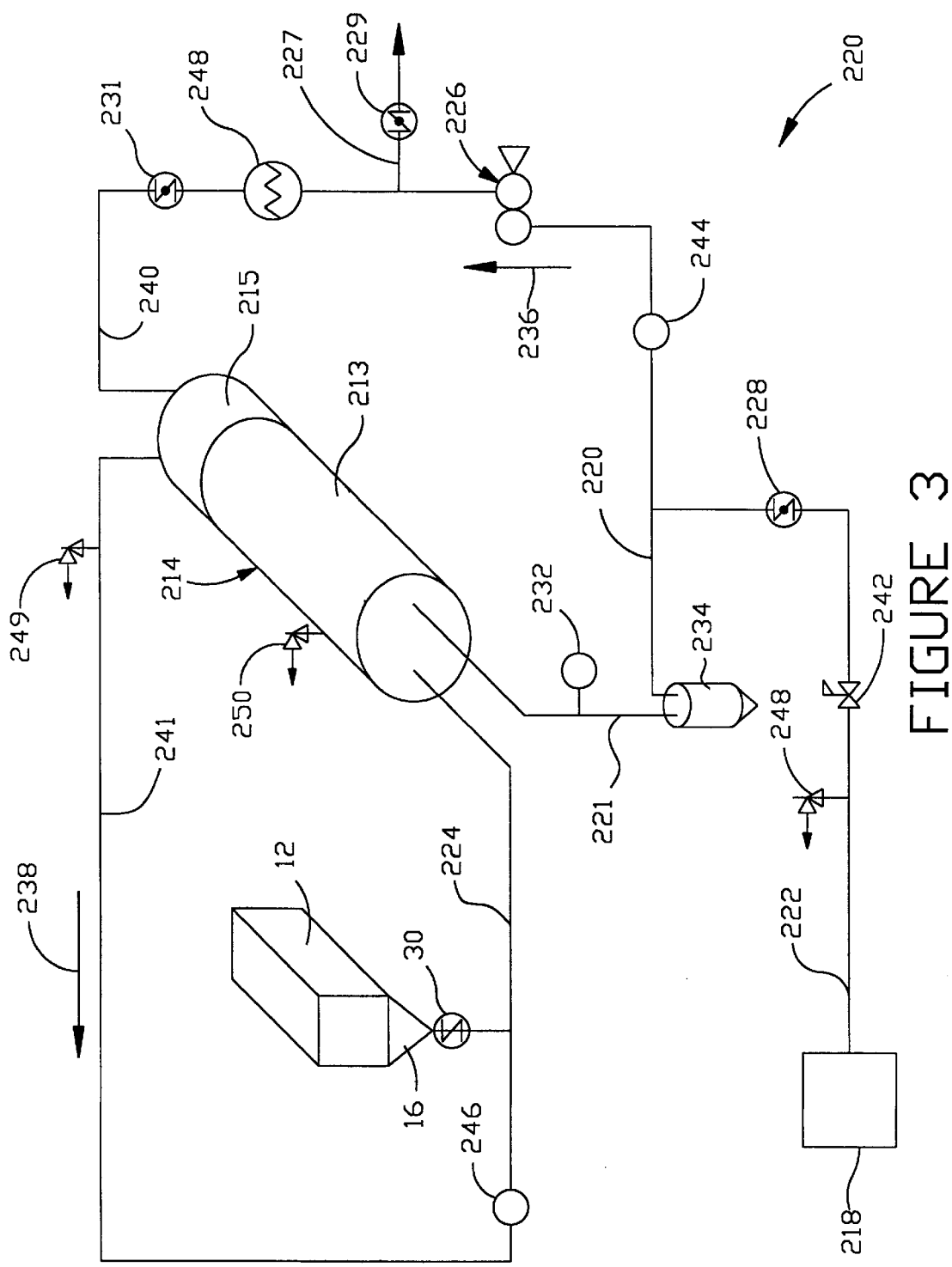
FIG. 3 is a schematic illustration of a third embodiment of the invention.

Referring now to the drawings, the method and apparatus of the invention is illustrated schematically by FIGS. 1 through 3. FIG. 1 illustrates inert gas purge system 10, a first embodiment of the invention, which is intended for use in transferring comminuted product (not shown) from unpressurized storage unit 12 to tank 14. Preferably, storage unit 12 includes a gravity-fed hopper 16 from which the product may be readily withdrawn. In addition, tank 14 may also be mounted on an over-the-road trailer (not shown) for transport by a highway tractor (also not shown).

System 10 includes inert gas source 18 that is preferably mounted on the trailer and which is in fluid communication with the tank, as through conduit 20 and conduit 22. In the alternative, the gas source may be located so that the flow of gas therefrom passes directly into the tank. The inert gas source is preferably adapted to supply a gas selected from the group consisting of nitrogen, argon, helium, carbon dioxide and mixtures thereof. The source may maintain the inert gas in a gaseous state, but it is preferable, especially if the source is mounted on the trailer, that the source comprise a cryogenic canister that is adapted to store the inert gas in the liquid state and release it to the system in the gaseous state. Good results have been obtained when the DURA-SERIES cryogenic canisters of Minnesota Valley Engineering, Inc. (MVE) of New Prague, Minn. are used as the inert gas source. Each such canister is provided with a liquified gas withdrawal system and a vaporizer to permit the liquified gas to be withdrawn from the canister and expanded into a gas. The DURA-SERIES canisters are sold containing liquid nitrogen, liquid argon and liquid carbon dioxide, among other gases, and they may be refilled with these and other inert gases and mixtures of gases. Preferably, a DURA-SERIES canister is utilized that is provided with sufficient liquid nitrogen so that upon expansion to a gaseous state, gaseous nitrogen may be obtained in a volume within the range of about 750 to about 4000 standard cubic feet. Such canisters are readily interchangeable, so that when the contents of a canister mounted on a trailer according to a preferred embodiment of the invention is discharged, the canister can be detached from its mounting and a replacement canister mounted in its place.

System 10 is also provided with conduit 24 that is connected between hopper 16 of storage unit 12 and tank 14 for carrying the product from the storage unit to the tank. This conduit may be provided in any convenient size and of any convenient construction, and preferably is of a flexible construction having an internal diameter of about 4 inches.

System 10 also includes compressor 26 that is in fluid communication with conduit 20 and tank 14, and through tank 14 with conduit 24. Compressor 26 is adapted to evacuate conduit 24 and the tank so that a pressure differential is created between the storage unit and the tank thereby to induce the flow of product from the storage unit to the tank. Preferably, the compressor will vent the gaseous contents of the tank and conduit to the atmosphere through line 27 as such evacuation is accomplished. Compressor 26 may be a conventional blower or compressor, and it may be mounted in any convenient location, preferably on the trailer or on a tractor. If mounted on the trailer, it is preferably powered by an auxiliary gasoline or diesel engine. If mounted on a tractor, it is preferably powered through a power take-off from the drive shaft.

Preferred system 10 also includes valve 28 that is located so as to permit, when open, flow of gas from the gas source into conduit 20, and valve 30 that is located so as to permit, when open, flow of product from the storage unit into conduit 24. In addition, it is desirable that a tank pressure gauge, such as gauge 32, be provided to permit monitoring of the pressure in the tank.

System 10 may be initiated by activating the compressor to evacuate the tank and the conduit so as to create a pressure differential between the storage unit and the tank. Preferably, the tank and the conduit are evacuated to a gauge pressure, as determined from gauge 32, of approximately −15 psig. Thereafter, valve 28 may be opened so that the inert gas may flow, though conduits 22 and 20, into the evacuated tank in response to the partial vacuum therein. Preferably, the inert gas is permitted to flow into the evacuated tank in response to the partial vacuum therein until the gauge pressure in the tank reaches a target level within the range of approximately −7 to −8 psig. For a tank having a volume of 1500 cubic feet, only 750 cubic feet of gas will be required to obtain such a gauge pressure reading. After the tank has been partially pressurized with inert gas, valve 30 may be opened so that the product may flow through conduit 24 to the tank in response to the partial vacuum therein. Since the storage facility is not pressurized at any point in the process, and since the invention will generally employ a lower volume of inert gas than conventional pressurizing systems, any increase in temperature due to the transfer of inert gas into the tank according to the invention will generally be less than would be encountered in a conventional pressurizing system.

It may be desirable to reduce the flow of inert gas into the tank when the target level of gauge pressure is reached in the tank. However, during product flow, the inert gas flow may be maintained, reduced or stopped, as desired. Nevertheless, if the gauge pressure in the tank reaches zero before the product transfer is completed, it may be necessary to stop the product flow and re-engage the compressor to evacuate the tank and conduit 24 once again, before product flow may be resumed.

It may also be desirable to provide the system of the invention in the form of a closed gas circuit, depending on the gas utilized as the inert gas and on other factors such as the environmental requirements of the facility at which the product transfer takes place. One closed system is inert gas purge system 110 illustrated in FIG. 2. System 110 is intended for use in transferring comminuted product (not shown) from unpressurized storage unit 12, having gravity-fed hopper 16, to tank 114. In addition, tank 114, like tank 14, may also be mounted on an over-the-road trailer (not shown) for transport by a highway tractor (also not shown).

System 110 includes inert gas source 118 that is preferably mounted on the trailer and which is in fluid communication with the tank, as through conduits 120, 121 and 122. System 110 is also provided with conduit 124 that is connected between hopper 16 of storage unit 12 and tank 114 for carrying the product from the storage unit to the tank. System 110 also includes compressor 126 that is in fluid communication with conduits 120 and 121, and tank 114, and through tank 114 with conduit 124. Compressor 126 is adapted to evacuate conduit 124 and the tank so that a pressure differential is created between the storage unit and the tank thereby to induce the flow of product from the storage unit to the tank. Conventional cyclone filter 134 may also be provided between conduit 120 and conduit 121 for removal of dust that may be contained in the tank during the evacuation process. Preferably, the compressor will vent the gaseous contents of the tank and conduit to the atmosphere through line 127, when valve 129 in line 127 is opened, and valve 131 in line 140 is closed.

Preferred system 110 also includes valve 128 that is located so as to permit, when open, flow of gas from the gas source into conduit 120, and pressure regulator 142, which may be employed to control such gas flow. System 110 also includes valve 30 that is located so as to permit, when open, flow of product from the storage unit into conduit 124. In addition, it is desirable that a tank pressure gauge, such as gauge 132, be provided to permit monitoring of the pressure in the tank.

Oxygen level meters may also be provided in the system to monitor the oxygen content therein. Such meters may be provided in tank 114 (not shown) and in lines 120 (meter 144) and 140 (meter 146), as well as in other convenient locations (not shown). If an oxygen meter is provided for measuring the oxygen content in the tank, such content may be monitored while the product is allowed to flow through conduit 124 to the tank. If the oxygen content in the tank reaches a predetermined limit, such as 12% or other suitable limit, it may be desirable to stop the flow of product to the tank, and to evacuate the tank and conduit 124 once again to create a pressure differential between the storage unit and the tank. Then, the inert gas may be allowed to flow once again into the evacuated tank in response to the partial vacuum therein, and the product may be allowed to flow through the conduit to the tank in response to the partial vacuum therein. Relief valves may also be provided in the system at suitable locations such as valve 149 in line 140 and valve 150 in tank 114.

System 110 may be initiated by activating the compressor to evacuate the tank and conduit 124 so as to create a pressure differential between the storage unit and the tank. Preferably, the tank and the conduit are evacuated to a gauge pressure, as determined from gauge 132, of approximately −15 psig. Thereafter, valve 128 may be opened so that the inert gas may flow, though conduits 122, 120 and 121, into the evacuated tank in response to the partial vacuum therein. Preferably, the inert gas is permitted to flow into the evacuated tank in response to the partial vacuum therein until the gauge pressure in the tank reaches a target level within the range of approximately −7 to −8 psig. After the tank has been partially pressurized with inert gas, valve 30 may be opened so that the product may flow through conduit 124 to the tank in response to the partial vacuum therein.

After nitrogen or another inert gas has been introduced into system 110, valve 129 may be closed and valve 131 opened to permit additional inert gas from source 118 to flow, as indicated by arrows 136 and 138, in a closed circuit through conduit 140 to its intersection with conduit 124. Such flow will assist in entraining product entering conduit 124 from the hopper of storage unit 12, as such product is transferred to tank 114 in response to the partial vacuum therein. It may also be desirable to incorporate heat exchanger 148 in conduit 140 for extraction of heat from the product and gas flowing therein, depending on the temperature sensitivity of the product to be transferred. For example, it is necessary when transferring purified terephthalic acid resin, that the temperature in the system not exceed 300° F. Good results have been obtained when a 4 inch air-to-air cooler manufactured by Pneu-Tech Bulk Transportation Services Inc. of Charenton, La. is employed.

Another closed system is inert gas purge system 210 illustrated in FIG. 3. System 210 is intended for use in transferring comminuted product (not shown) from unpressurized storage unit 12, having gravity-fed hopper 16, to product storage container 213 of tank 214. Tank 214 also includes gas-storage chamber 215, the use of which will be subsequently explained.

System 210 includes inert gas source 218 that is preferably mounted on the trailer and which is in fluid communication with the tank, as through conduits 222, 220 and 221. System 210 is also provided with conduit 224 that is connected between hopper 16 of storage unit 12 and container 213 for carrying the product from the storage unit to the container. System 210 also includes compressor 226 that is in fluid communication with conduits 220 and 221, and container 213, and through container 213 with conduit 224. Compressor 226 is adapted to evacuate conduit 224 and container 213 so that a pressure differential is created between the storage unit and the container thereby to induce the flow of product from the storage unit to the container. Preferably, the compressor will vent the gaseous contents of the container and conduit to the atmosphere through line 227, when valve 229 in line 227 is opened, and valve 231 in line 240 is closed. Cyclone filter 234 may also be provided between conduit 220 and conduit 221 for removal of dust that may be contained in the product storage container during the evacuation process.

Preferred system 210 also includes valve 228 that is located so as to permit, when open, flow of gas from the gas source into conduit 220, and pressure regulator 242, which may be employed to control such gas flow. System 210 also includes valve 30 that is located so as to permit, when open, flow of product from the storage unit into conduit 224. In addition, it is desirable that a tank pressure gauge, such as gauge 232, be provided to permit monitoring of the pressure in container 213.

System 210 may be initiated by activating the compressor to evacuate container 213 and conduit 224 so as to create a pressure differential between the storage unit and the container. Preferably, the tank and the conduit are evacuated to a gauge pressure, as determined from gauge 232, of approximately −15 psig. Thereafter, valve 228 may be opened so that the inert gas may flow, though conduits 222, 220 and 221, into the evacuated tank in response to the partial vacuum therein. Preferably, the inert gas is permitted to flow into the evacuated tank in response to the partial vacuum therein until the gauge pressure in the tank reaches a target level within the range of approximately −7 to −8 psig. After the tank has been partially pressurized with inert gas, valve 30 may be opened so that the product may flow through conduit 224 to the tank in response to the partial vacuum therein.

After inert gas has been introduced into system 210, valve 229 may be closed and valve 231 opened to permit additional inert gas from source 218 to flow, as indicated by arrows 236 and 238, in a closed circuit through conduit 240 to gas-storage chamber 215, and from chamber 215 through conduit 241, as indicated by arrow 238, to the intersection of conduits 241 and 224. Preferably the flow from the gas-storage chamber is regulated by suitable flow regulating means (not shown) as are known to those having ordinary skill in the art to which the invention relates. Such flow will assist in entraining product entering conduit 224 from the hopper of storage unit 12, as such product is transferred to container 213 in response to the partial vacuum therein. One advantage of embodiment 220 (FIG. 3) over embodiment 110 (FIG. 2) resides in the fact that chamber 215 may be used to store a nitrogen-rich atmosphere that accumulates therein during operation of the system rather than having such nitrogen-rich atmosphere exhausted to the atmosphere through relief valves 149 and 150. This nitrogen-rich gaseous mixture will be available to assist in evacuating a storage unit such as unit 12 in a subsequent unloading operation, and will correspondingly reduce the amount of inert gas needed from source 218. Experience with the invention has shown that a single 4000 cubic foot DURA-SERIES nitrogen canister that is used in connection with a system configured as embodiment 110 having a 1500 cubic foot tank will typically provide enough gaseous nitrogen to permit the unloading of two standard railcars, whereas if the system is configured as embodiment 220, the same 4000 cubic foot DURA-SERIES nitrogen canister will permit the unloading of three railcars.

Oxygen level meters may also be provided in the system to monitor the oxygen content therein. Such meters may be provided in container 213 (not shown) and in lines 220 (meter 244) and 240 (meter 246), as well as in other convenient locations (not shown). If an oxygen meter is provided for measuring the oxygen content in the tank, such content may be monitored while the product is allowed to flow through conduit 124 to the tank. Relief valves may also be provided in the system at suitable locations such as valve 248 in line 222, valve 249 in line 241 and valve 250 in container 213. In addition, if desired, a sight glass (not shown) may be provided in line 224 near container 213 to permit visual observation of the product flowing through line 224 into the container. It may also be desirable to incorporate heat exchanger 248, similar to heat exchanger 148 of embodiment 110, in conduit 240 for extraction of heat from the product and gas flowing therein, depending on the temperature sensitivity of the product to be transferred.

Figure 6:
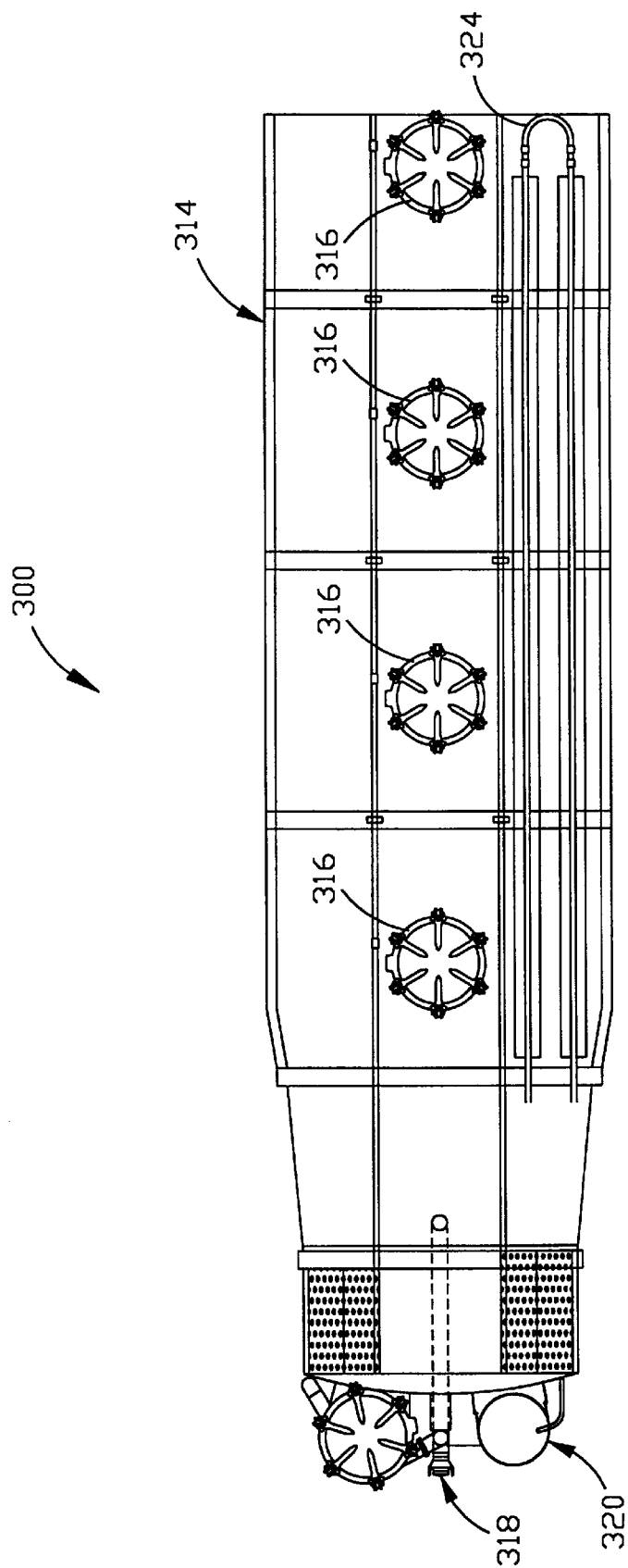
FIG. 6 is a top view of the trailer of FIGS. 4 and 5, taken along the line 6—6 of FIG. 4.

FIGS. 4 through 6 illustrate a preferred embodiment of an improved trailer into which comminuted product may be transferred from a storage unit such as unit 12 of FIGS. 1 through 3 according to the method of the invention illustrated therein. As shown in FIGS. 4 through 6, trailer 300 includes frame 310, a portion of which is shown in FIG. 4. Mounted on the frame are a plurality of wheels 312, two sets of which are also shown in FIG. 4. The frame is adapted for attachment to a tractor at the front end (not shown). Also mounted on the frame is tank 314, which is divided into several product containers, each of which has a product loading port 316 that is adapted to receive said product. Alternatively, the improved trailer could be provided with a single product container. A compressor (not shown), such as compressor 26 of FIG. 1, having a pressure side and a vacuum side and being adapted to create a pressure differential between the pressure side and the vacuum side is also provided. Preferably, the compressor is mounted on the trailer or an associated tractor. The system also includes a first conduit such as conduit 20 of FIG. 1 that connects the vacuum side of the compressor and vacuum entry port 318 of trailer 300.

Cryogenic canister 320 is mounted on the rear end of the trailer, as best illustrated in FIG. 5. When valve 321 is opened, liquid inert gas from canister 320 flows into vaporizer 324 through entry lines 325 and 326. Gaseous inert gas returns through return line 328 into inert gas supply manifold 330. Alternatively, valve 322 may also be employed to connect another source of liquid inert gas (other than canister 320), such as for example, if canister 320 is emptied during the transfer process and it is desired to quickly connect another full canister (not shown) to the system without taking the time to dismount canister 320 and mount another one.

A second conduit such as conduit 22 of FIG. 1 connects gas supply manifold 330 and the first conduit. When valve 321 or valve 322 is open, gas is permitted to flow from the gas source into the first conduit. The system also includes a third conduit such as conduit 24 of FIG. 1 that is connected between storage unit 12 and loading port 316. Such conduit is preferably provided with a suitable sealing means (not shown) for securing the conduit to port 316 in an airtight fashion so as to permit the tank to be readily evacuated. A second valve such as valve 30 of FIG. 1 is located so as to permit, when open, flow of product from the storage unit into the third conduit.

In transferring product into the improved trailer, the first and second valves may be closed and the compressor activated to create negative pressure in the first conduit and the tank so as to evacuate the tank. Then the compressor may be deactivated and the first valve opened so that the inert gas will flow through the first conduit and into the tank in response to the partial vacuum therein, and the second valve may be opened to permit product to flow through the third conduit and into the tank in response to the partial vacuum therein.

The improved trailer of the invention may also include a fourth conduit such as conduit 140 of FIG. 2 connecting the pressure side of the compressor and the third conduit adjacent to the second valve. The fourth conduit may also be provided in two portions such as conduits 240 and 241 of FIG. 3, if a separate gas-storage chamber, such as chamber 215 of the embodiment of FIG. 3 is employed. The improved trailer may also include a cyclone filter such as filter 134 of FIG. 2, a heat exchanger such as heat exchanger 148 of FIG. 2, and various relief valves and oxygen meters as are deemed suitable. In addition, the improved trailer, as well as other embodiments of the invention, may include additional flow control valves (beyond those shown in the drawings) in such of the conduits as may be deemed convenient for efficient operation of the invention.

Although this description contains many specifics, these should not be construed as limiting the scope of the invention but as merely providing illustrations of some of the presently preferred embodiments thereof, as well as the best mode contemplated by the inventor of carrying out the invention. The invention, as described herein, is susceptible to various modifications and adaptations, and the same are intended to be comprehended within the meaning and range of equivalents of the appended claims.

What is claimed is:

1. A method for transferring comminuted product from an unpressurized storage unit to a tank, which method comprises:
   (a) providing an inert gas source;
   (b) providing a conduit to carry the product from the storage unit to the tank;
   (c) connecting the conduit between the storage unit and the tank;
   (d) evacuating the tank and the conduit so as to create a pressure differential between the storage unit and the tank;
   (e) allowing the inert gas to flow into the evacuated tank in response to a partial vacuum therein;
   (f) allowing the product to flow through the conduit to the tank in response to the partial vacuum therein.

2. The method of claim 1 which includes venting the gaseous contents of the tank and the conduit to the atmosphere while evacuating the tank and the conduit to create a pressure differential between the storage unit and the tank.

3. The method of claim 1 which includes venting the gaseous contents of the tank and the conduit to a gas-storage chamber while evacuating the tank and the conduit, from which chamber the gaseous contents may be withdrawn to assist in entraining the product from the storage unit to the tank.

4. The method of claim 1 which includes:
   (g) providing a heat exchanger in the conduit for extraction of heat from the gas flow therein.

5. The method of claim 1 which includes:
   (a) providing means for measuring oxygen content in the tank;
   (b) measuring the oxygen content in the tank while the product is allowed to flow through the conduit to the tank;
   (c) stopping the flow of product to the tank if the oxygen content in the tank reaches a predetermined limit; and then
   (d) evacuating the tank and the conduit to create a pressure differential between the storage unit and the tank;
   (e) allowing the inert gas to flow into the evacuated tank in response to the partial vacuum therein;
   (f) allowing the product to flow through the conduit to the tank in response to the partial vacuum therein.

6. The method of claim 1 which includes:
   (d) evacuating the tank and the conduit to a gauge pressure of approximately −5 psig;
   (e) allowing the inert gas to flow into the evacuated tank in response to the partial vacuum therein until the gauge pressure in the tank reaches a target level within the range of approximately −7 to −8 psig;
   (f) allowing the product to flow through the conduit to the tank in response to the partial vacuum therein.

7. The method of claim 6 which includes reducing the flow of inert gas into the tank when the target level gauge pressure is reached in the tank.

8. An inert gas purge system for a trailer-mounted product storage tank for use in transferring comminuted product from an unpressurized storage unit, said system comprising:

(a) an inert gas source that is mounted on a trailer and which is in fluid communication with the tank;

(b) a conduit that is connected between the storage unit and the tank for carrying the product from the storage unit to the tank;

(c) a compressor that is in fluid communication with the conduit and tank, said compressor being adapted to evacuate the conduit and the tank so that a pressure differential is created between the storage unit and the tank thereby to induce the flow of product from the storage unit to the tank;

whereby:

(d) the compressor may be activated to evacuate the tank and the conduit so as to create a pressure differential between the storage unit and the tank; and (e) the inert gas may be allowed to flow into the evacuated tank in response to a partial vacuum therein; and (f) the product may be allowed to flow through the conduit to the tank in response to the partial vacuum therein.

9. The system of claim 8 wherein the compressor is adapted to evacuate the tank and the conduit so as to create a pressure differential between the storage unit and the tank, and to vent the gaseous contents of the tank and conduit to the atmosphere.

10. The system of claim 8 which includes a heat exchanger that is located in the conduit for extraction of heat from the product and gas flowing therein.

11. The system of claim 8 wherein the inert gas source is adapted to supply a gas selected from the group consisting of nitrogen, argon, helium, carbon dioxide and mixtures thereof.

12. The system of claim 8 wherein the inert gas source is comprised of a cryogenic canister containing liquid nitrogen, which canister is provided with a liquified gas withdrawal system and a vaporizer to permit the liquified nitrogen to be withdrawn from the canister and expanded into a gas.

13. The system of claim 12 wherein the canister is provided with sufficient liquid nitrogen so that upon expansion to a gaseous state, gaseous nitrogen may be obtained in a volume within the range of about 750 to about 4000 standard cubic feet.

14. The system of claim 12 wherein the canister is detachably mounted onto the trailer.

15. An improved trailer for receiving comminuted product from a storage unit and for carrying said product, said trailer including:

(a) a frame having a plurality of wheels mounted thereon, said frame being adapted for attachment to a tractor;

(b) a tank mounted on the frame, which tank has a product loading port that is adapted to receive said product;

wherein the improvement comprises an inert gas purge system comprising:

(c) means for measuring the oxygen content in the tank;

(d) an inert gas source that is mounted on the trailer;

(e) a compressor having a pressure side and a vacuum side and being adapted create a pressure differential between the pressure side and the vacuum side;

(f) first conduit that connects the tank and the vacuum side of the compressor;

(g) second conduit that connects the gas source and the first conduit;

(h) a first valve that is located so as to permit, when open, flow of gas from the gas source into the first conduit;

(i) third conduit that connects the loading port of the tank to the storage unit;

(j) a second valve that is located so as to permit, when open, flow of product from the storage unit into the third conduit;

whereby:

(k) the first and second valves may be closed and the compressor activated to create negative pressure in the first conduit and the tank so as to evacuate the tank; and (l) the compressor may be deactivated and the first valve opened so that the inert gas will flow through the first conduit and into the tank in response to a partial vacuum therein until the oxygen content in the tank reaches a predetermined limit; and (m) the second valve may be opened to permit product to flow through the third conduit and into the tank in response to the partial vacuum therein.

16. The improved trailer of claim 15 which includes a fourth conduit connecting the pressure side of the compressor and the third conduit adjacent to the second valve.

17. The improved trailer of claim 16 which includes a heat exchanger that is located in the fourth conduit for extraction of heat from the gas flow in said fourth conduit.

18. The improved trailer of claim 15 wherein the inert gas source is comprised of a cryogenic canister containing liquid nitrogen, which canister is provided with a liquified gas withdrawal system and a vaporizer to permit the liquified nitrogen to be withdrawn from the canister and expanded into a gas.

19. The improved trailer of claim 18 wherein the canister is provided with sufficient liquid nitrogen so that upon expansion to a gaseous state, gaseous nitrogen may be obtained in a volume within the range of about 750 to about 4000 standard cubic feet.

20. The improved trailer of claim 18 wherein the canister is detachably mounted onto the frame.

* * * * *

UNITED STATES PATENT AND TRADEMARK OFFICE
CERTIFICATE OF CORRECTION

PATENT NO : 6,079,461
DATED : June 27, 2000
INVENTOR(S): Larry Nelson Fisher

It is certified that error appears in the above-identified patent and that said Letters Patent are hereby corrected as shown below:

At column 10, line 57 (line 2 of part (d) of claim 6), delete "-5 psig" and substitute therefor-- -15 psig --.

Signed and Sealed this

Third Day of April, 2001

Attest:

NICHOLAS P. GODICI

Attesting Officer     Acting Director of the United States Patent and Trademark Office